United States Patent [19]

McNally

[11] 4,148,568
[45] Apr. 10, 1979

[54] MIRROR MECHANISM FOR A FILM PROJECTOR

[75] Inventor: Gordon McNally, Newcastle on Tyne, England

[73] Assignee: Vireco, A.G., Zurich, Switzerland

[21] Appl. No.: 852,698

[22] Filed: Nov. 18, 1977

[30] Foreign Application Priority Data

Nov. 19, 1976 [GB] United Kingdom ............ 48447/76

[51] Int. Cl.² ............................................ G03B 41/10
[52] U.S. Cl. .................................................. 352/109
[58] Field of Search ....................... 352/105, 106, 109

[56] References Cited

U.S. PATENT DOCUMENTS

| | | | |
|---|---|---|---|
| 1,808,603 | 6/1931 | Huc | 352/109 |
| 1,875,193 | 8/1932 | Ruhnau | 352/109 |
| 3,708,226 | 1/1973 | Askren et al. | 352/109 |

Primary Examiner—Monroe H. Hayes
Attorney, Agent, or Firm—Robert F. O'Connell

[57] ABSTRACT

A mirror mechanism for a continuous-motion cinematograph film projector. A drive shaft is mechanically coupled to the film transport and is coupled through a slipping clutch to drive a cam. A cam follower riding on the cam profile oscillates a compensating mirror. Frame synchronization of the mirror scan is effected by detection of optical synchronizing marks on the film. Release pulses are generated in response to the synchronizing marks to energize a solenoid to release a blocking member which otherwise blocks movement of the cam.

8 Claims, 9 Drawing Figures

FIG.3
FIG.4
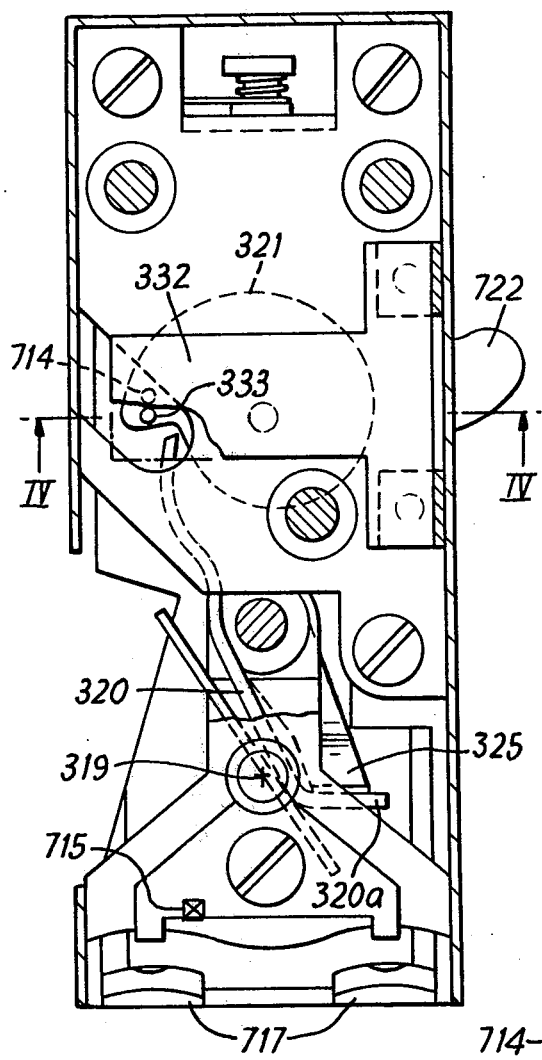
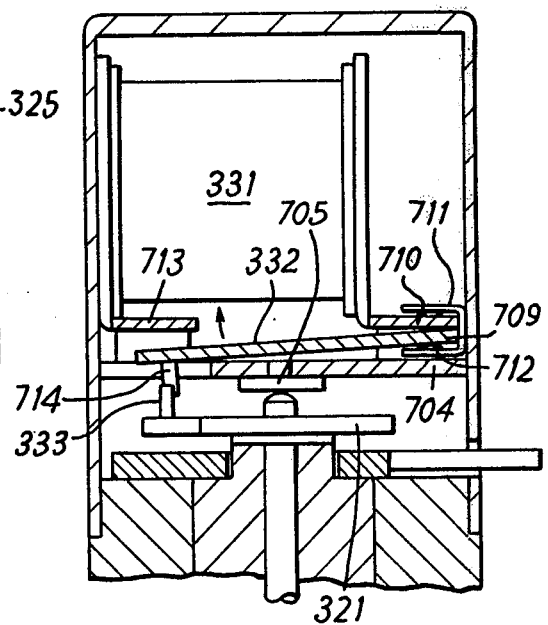

MIRROR MECHANISM FOR A FILM PROJECTOR

The invention relates to a mirror mechanism for a continuous-movement cinematograph film projector. A projector in which the film moves continuously, instead of intermittently in the conventional way, has advantage in that strain on the film is minimised. However, a continuously-driven system requires an optical compensator for compensating for the movement of the film frames as they traverse the film gate. The principal disadvantage of continuous-movement film systems is the practical difficulty of providing an effective optical compensator. This practical difficulty has prevented the production of a simple, inexpensive film projector of this kind.

One of the simplest forms of optical compensator consists of a mirror which is oscillated back and forth to follow the movement of successive film frames as they pass. Such a mirror may be driven mechanically or electrically by devices coupled to the film drive mechanism. Such arrangements are shown, for example, in British Patent Specification No. 1395622, which shows a mechanical drive arrangement, and British Patent Specification No. 1204994, which shows an electrical drive arrangement. Whatever drive system is used, measures must be taken to ensure that each mirror scan starts at the appropriate time in relation to the respective frame. Since film can stretch, some form of synchronisation between the mirror scan and the film frames is necessary. Both the above-mentioned specifications disclose arrangements which derive electrical synchronisation from the film by photo-electric means. However, both have severe practical disadvantages because they attempt to achieve synchronisation by means of an electromagnetic clutch which disengages to allow fly-back of the mirror and re-engages to drive the mirror in each forward scan. It has not been possible to solve the problem of making a practical and inexpensive electromagnetic clutch of sufficient power, low enough inertia, and reliability sufficient to operate at at least 16 cycles per second for long periods of time.

The present invention seeks to provide an improved mirror mechanism.

According to the invention there is provided a mirror mechanism for a continuous-movement cinematograph film projector, while projector has means for driving the film continuously and a drive shaft driven in synchronism with the film, the mirror mechanism comprising a compensating mirror; a pivot axis about which the mirror oscillates; a lever arm coupled to the mirror to oscillate the mirror; a cam-follower portion on the lever arm; a cam having a profile on which the cam-follower portion rides; a spring for urging the cam-follower portion into contact with the profile of the cam; a slipping clutch for coupling the cam to the drive shaft and allowing the cam to be arrested while the drive shaft continues to rotate; a blocking member having a blocking position where it engages the cam and a release position where it is clear of the cam, the cam being arrested by the blocking member when in the blocking position; and a solenoid which, when energised by an electrical release pulse, withdraws the blocking arm to the release position to release the cam. With this arrangement the cam is driven mechanically through the slipping clutch virtually continuously, there being normally only the lightest contact between the blocking member and the cam as the blocking member is withdrawn to the release position for each scan. The weight of the moving parts can be minimised and virtually instantaneous acceleration can be achieved. The accuracy of the mirror scan is ensured by the machined cam profile and the function of the synchronising solenoid is merely to retard the start of the scan momentarily as necessary. The solenoid can be made accurately and cheaply.

Preferably the cam is a scroll cam having two flat faces perpendicular to an axis about which the cam rotates, the cam profile is constituted by the edge face defined between the two flat faces and a pin is mounted to protrude from one of the flat faces, the blocking member being constituted by blocking pin which moves between the blocking position and the release position to engage and release the cam pin.

Preferably the cam-follower portion is an upstanding roller and the scroll cam has one or more steps where the roller is allowed to move rapidly to cause fly-back of the mirror and, near the step the cam is provided with a desmodromic channel section to engage the roller to inhibit bounce.

While the present invention can be employed in a projector adapted for any size of cinematographic film it has particular application in conjunction with the projector described and claimed in co-pending Patent Application No. 48442/76 which describes an arrangement in which the cam-operated oscillating mirror is situated between the film and the projector lens and is arranged very close to both, with a consequent reduction in film frame pitch to typically less than 3 mm. This arrangement allows the production of an extremely small mirror mechanism which has low inertia and consequent very rapid fly-back between frames. However, the extremely small size of the mirror mechanism presents some difficulties. If, during the course of operation, a fault should develop the very small size and critical nature of the mirror movement makes maintenance by a local engineer difficult.

In order to resolve this difficulty it is proposed, in accordance with a preferred feature of the invention, to mount the mechanism as a unit in a module, the module having a disengageable mounting including a coupling for the drive shaft, whereby the module may be mounted and removed from the projector as a unit.

The module may be a plug-in or screw-in unit. With this arrangement the whole mirror mechanism is replaceable as a unit if any fault should develop. In this way precise alignment of the components of the mirror mechanism can be assured.

Preferably the cam has a single "fly-back" step and the cam radius progressively increases to give a forward scan from the foot of the step to the top of the step. In this way the cam rotates one revolution for each scan of the mirror. In another arrangement it is possible to arrange that the cam has more than one step and rotates less than one revolution for each mirror scan.

Coupling between the drive shaft and the cam may be effected mechanically and registration of position may be accomplished by arranging that coupling is effected through the intermediary of a spring-loaded pin which engages in an appropriately-positioned hole only when the coupling is at the correct relative angular position. In another embodiment of the invention the coupling is effected magnetically.

Preferably, however the slipping clutch has two discs which bear against each other face-to-face, one disc being coupled directly to the cam and the other being adapted for direct mating engagement with the drive shaft, which mating engagement constitutes the said coupling.

The invention will further be described with reference to the accompanying drawings, of which:

FIG. 3 is a front view, partly in section, of the module of FIG. 2;

FIG. 4 is a cross-sectional view taken at IV—IV of FIG. 3;

Figure 1:
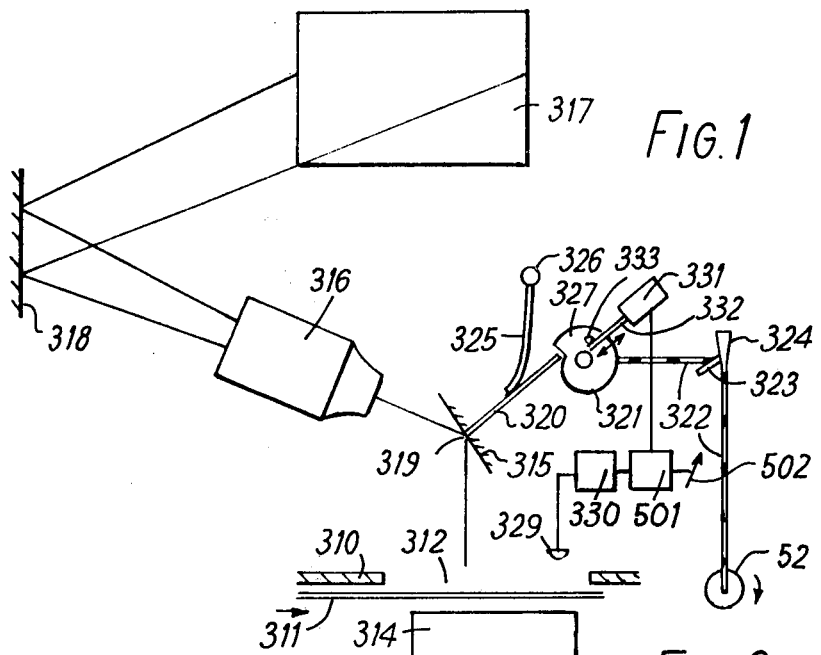
FIG. 1 is a schematic diagram illustrating the manner of operation of a mirror mechanism in accordance with the invention.

Referring to FIG. 1 there is shown a schematic view of a continuous-motion cinematograph film projector. The film is contained in a cassette, part of the body of which is shown at 310. The film itself is shown at 311 and runs continuously in the direction shown by the arrow. The cassette has a cut-out portion 312 where light is projected through the film for viewing. The cut-out portion 312 accommodates a prism 314 which reflects light from a high-powered lamp through the film to be projected. The projection light is reflected from an oscillating mirror 315 through a projection lens 316. The projection lens is effective to project an image on a screen 317 after reflection by a mirror 318.

The mirror 315 is oscillated in a manner to arrest, as far as lens 316 is concerned, the apparent motion of the film frames as they pass across the viewing region. In order to do this the mirror is oscillated about a pivot 319 so as to follow, in a forward scan, each frame of the film as it passes. The mirror then flies back, very rapidly to follow the next frame.

Movement of the mirror is effected by a lever arm 320 which is rigidly fixed to the mirror and which bears on the surface of a cam 321. Cam 321 is rotated by a mechanical drive 322 from the drive for a capstan wheel 52 which bears on the film and drives it frictionally. Drive 322 includes a rubber wheel 323 and a tapered portion 324 of a shaft whereby adjustment of the drive ratio can be achieved manually.

The cam rotates one revolution for each frame which passes the aperture 312. A leaf-spring 325 fixed at 326 bears on arm 320 and maintains the arm in contact with the surface of the cam. The profile of the cam is such that the arcuate movement of the mirror 315 is such as to track each frame accurately. At the end of each forward scan the end of arm 320 falls off a step 327 in the cam and this causes fly-back.

It is not sufficient that the cam 321 should be driven in exact speed synchronism with the film 311. It is also necessary that each forward scan of the mirror should begin at the appropriate time with regard to the position of the film frame. This phase-synchronisation is carried out by an escapement mechanism. Light from the projection lamp (not shown) is directed through the prism 314 to a photo-cell 329. The electrical signals from the photo-cell 329 are applied to a waveform-amplifying and shaping circuit 330. The output from circuit 330 is used to energise an escapement solenoid 331. Solenoid 331 operates a blocking arm 332. The normal position for the blocking arm is shown in the drawing and in this position the arm blocks a pin 333 which is mounted on cam 321. Therefore, until the solenoid is energised and arm 332 is withdrawn, the motion of the cam is inhibited. There is a slip device (not shown in FIG. 1) whereby the cam may be arrested while the drive from the drive mechanism 322 is allowed to continue.

The film has a number of synchronising marks optically printed in register with the frames. On the passage of each synchronising mark a pulse is derived from photo-cell 329. This is used to release the solenoid so that the cam motion is started in exact phase-synchronisation with the passage of a frame.

FIG. 1 shows the provision of an adjustable electronic delay circuit 501 connected between the sensor 329 and the solenoid 331. Circuit 501 has a delay which corresponds to the time taken for the film to travel the length equal to the distance from a frame edge to the corresponding synchronising mark. This normally provides exact synchronisation. However, the delay circuit, which is based on an integrated circuit timer unit, has a manual control 502 which is coupled to one of the manual controls of the projector. This allows the delay to be set precisely by hand to ensure accurate synchronisation. The range of the delay variation is equivalent to the traverse time of a little more than a complete frame pitch.

The mechanism of FIG. 1 is extremely small, as is the frame pitch of the film 311. In particular, the small frame pitch and the closeness of the film to the mirror 315 allows the mirror mechanism to be made sufficiently small for the very rapid fly-back to be achieved. For example, in the embodiment of the invention to be described the distance from the mirror pivot 319 to the film is 6.5 mm., the length of the film gate aperture is 4.2 mm., being twice the frame pitch of the film, which is 2.1 mm. The length of arm 320 is 14 mm. The maximum radius of cam 321 is 5.5 mm. The depth of step 327 is 2.2 mm. The focal length of lens 316 is 13 mm. In accordance with one aspect of the present invention, this small and delicate mirror mechanism is housed in a module as a removable unit.

Figure 2:
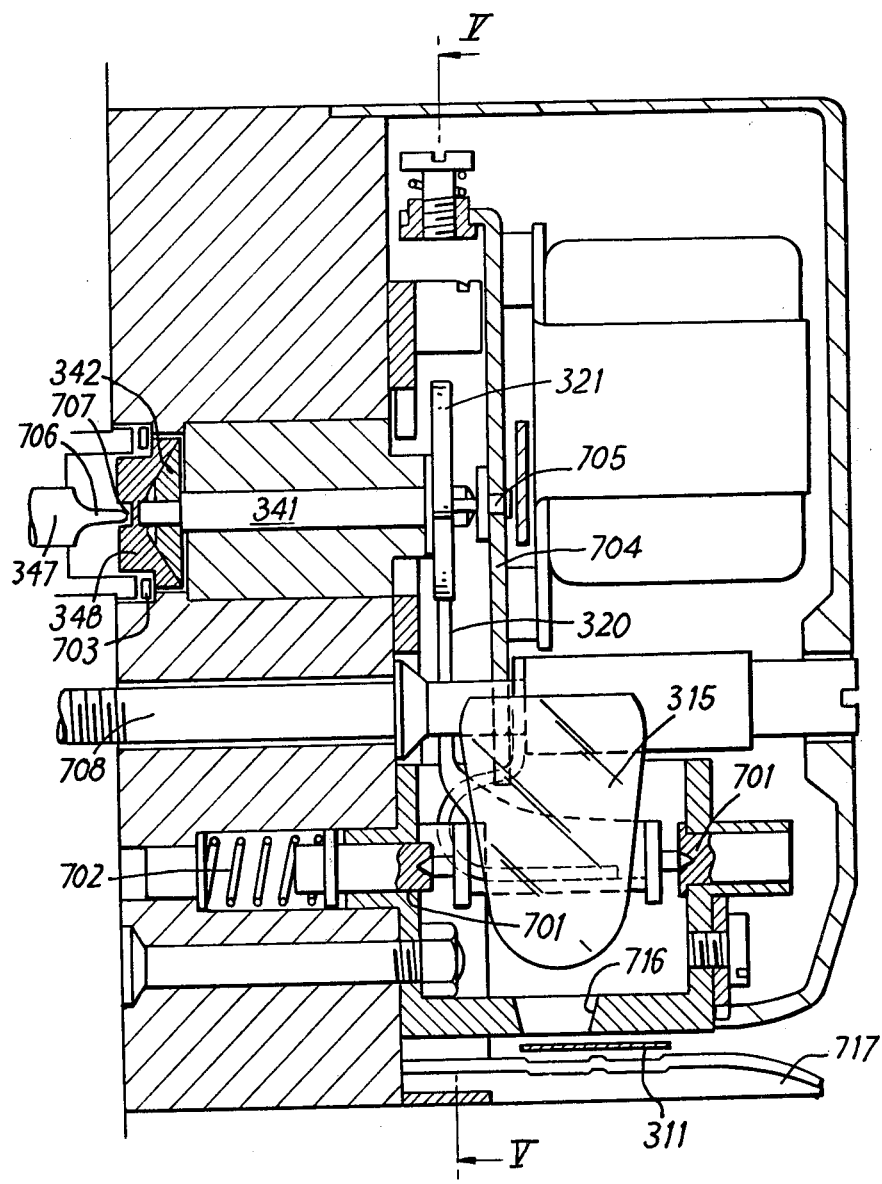
FIG. 2 is a side view, partly in section, of a module embodying a mirror mechanism in accordance with the invention.
Figure 5:
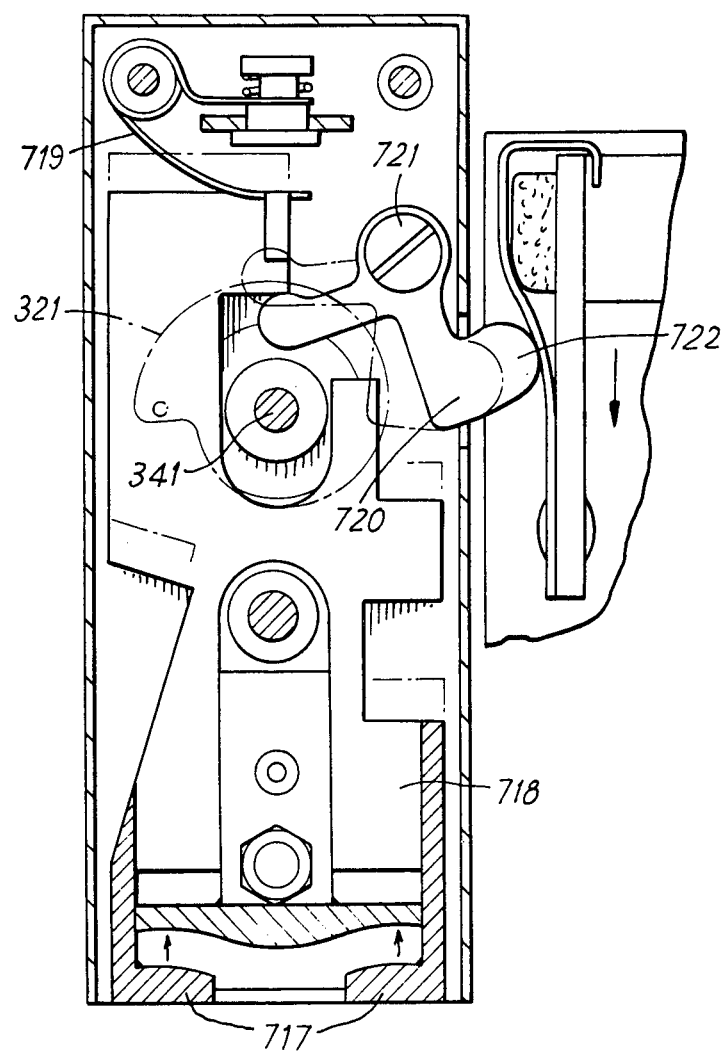
FIG. 5 is a cross-sectional view taken at V—V of the mechanism of FIG. 2.

FIGS. 2 to 5 show a module incorporating a mirror mechanism in accordance with the invention, of the general nature shown in FIG. 1. The same references are used where appropriate as in FIG. 1. Thus, the module contains the mirror 315 mounted to pivot in bearings 701 (FIG. 2). A coil spring 702 maintains an even bearing pressure at the bearings. The mirror is made of glass 0.010" thick and is provided with a surface reflective coating so that reflected light does not penetrate the glass.

The cam-follower arm 320 is fixed to the mirror and bears on the cam profile. Beyond the mirror the arm 320 has an angled extensions 320a (FIG. 3) against which bears one end of a U-shaped leaf spring 325. The other end of the spring is fixed to the module housing.

The cam 327 is mounted on a cam shaft 341 (FIG. 2) which is driven through a slipping clutch from a drive shaft 347 mounted in the machine proper. The slipping clutch consists of two clutch plates 342 and 348, plate 342 being mounted on the cam shaft 341 and plate 348 being retained in the module housing by a split collet type retaining ring 703. The plates 342 and 348 have mating conical surfaces which are urged together by spring pressure imparted by the resilience of a plate 704. A plastics stud 705 is mounted in the plate and presents a bearing surface which is urged against the end of the cam shaft 341. Drive from the drive shaft 347 to the clutch plate 348 is ensured by a simple screw-driver 706 and slot 707 type key. This allows the drive to be engaged and disengaged by insertion and removal of the module with respect to the projector. The module is held in place by a fixing screw 708.

FIG. 4 shows the solenoid 331 and the blocking arm 332. The blocking arm is not longitudinally retractable as shown in FIG. 1 but pivots about its end 709, where it is maintained in contact with one pole-piece 710 of the solenoid by means of U-shaped spring clips 711 formed with internal dimples 712 to bear on the arm and pole-piece. Another pole-piece 713 of the solenoid is situated above the end of arm 332 so that the arm forms an armature between the pole-pieces and is attracted magnetically to the horizontal position when the solenoid is energised by a synchronising pulse. When the solenoid is de-energised the arm falls by its weight to its blocking position. A blocking pin 714 at the end of the arm engages with pin 333 when the arm is in its blocking position. When the blocking arm is withdrawn by the solenoid to its release position the pin 714 is clear of pin 333.

The circuitry 330, 502 (FIG. 1) is mounted as a unit with the solenoid and is not shown separately. The circuitry is connected to the photo-diode 329, (not shown). The photo-diode receives light from the synchronising marks on the film from a bundle of optical fibres which terminates at 715 (FIG. 3). Adjustment of the delay of the solenoid trigger circuit is effected by a trimming control (not shown but corresponding to 502 of FIG. 1) accessible by means of a screw-driver.

FIG. 2 shows the position of film 311 on insertion of the cassette into the projector. The module housing defines a film gate aperture 716 and beneath the aperture plate is a film guide fork 717. The fork is mounted on a plate 718 (FIG. 5) which slides in the module housing, being urged normally downwardly by a spring 719. A crank arm 720 is pivoted at 721 and engages the plate 718 to raise it against and bring the film against the film gate. This action is achieved by forcing inwardly a projecting end 722 of the crank arm by means of a sliding linear cam 723 which is pushed downwardly in the direction shown by the arrow when a manual push-button (not shown) is depressed to run the film.

The film at the film gate is guided in a curve, and not a straight track as shown in FIG. 1. In particular, the film at the gate runs in a circular arc centred at the mirror pivot axis 319. This demands a different cam profile from the straight film path case. The curved path has the advantage that the film to lens distance does not change across the scan. However, there are some disadvantages. Firstly, since the film is curved in one direction and plane in the orthogonal direction, there is some differential distortion. Secondly there may be more wear on the film than if the film track were straight. Thus, in practice the film path may be straight or less curved than a circular arc centered on the mirror pivot axis. The projection lens design would be determined to accommodate the particular film configuration used. The different scan characteristics required of the mirror would be determined merely by altering the shape of the cam profile.

Figure 6:
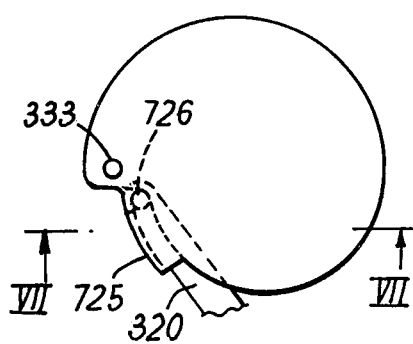
FIG. 6 is a plan view of an alternative cam for use in the mechanism of FIGS. 2 to 5.
Figure 7:
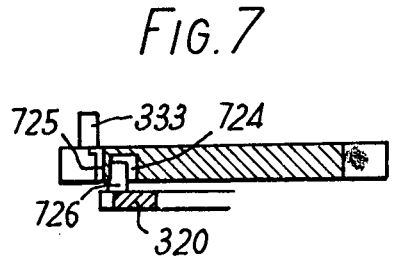
FIG. 7 is a part cross-sectional view of the cam of FIG. 6.

Referring now to FIGS. 6 and 7 there is shown a modification of the cam 321 and cam-follower 320 which overcomes a difficulty sometimes found with the mechanism described above. The difficulty is that when the cam-follower falls off the step of the cam it strikes the cam surface and tends to bounce. This gives an unwanted mirror vibration which detracts from the picture quality. In order to overcome this the cam is provided, at least near the base of the step with a desmodromic portion constituted by a groove 724 between the cam profile and a retainer 725. The cam-follower is modified to have a roller 726 which rides in the groove. As shown in broken line in FIG. 6 the retainer may extend down the step and give a sinusoidally curved desmodromic portion.

Figure 8:
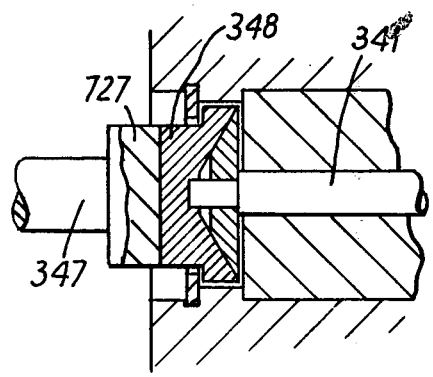
FIG. 8 is a schematic diagram illustrating an alternative method of coupling the cam to the drive shaft.
Figure 9:
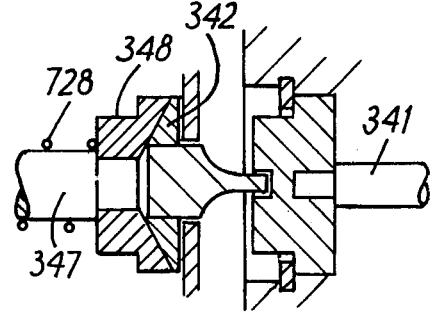
FIG. 9 is a schematic diagram illustrating another alternative method of coupling the cam to the drive shaft.

Modifications to the arrangement described above with reference to FIGS. 1 to 7 are clearly possible and two are shown in FIGS. 8 and 9. FIG. 8 shows a magnetic coupling between the drive shaft 347 and the clutch plate 348, instead of the keyed coupling described above. In FIG. 8 the end of the drive shaft has a magnet 727 which locks on to the clutch plate 348, which is made of magnetic material. Indeed, a modification of this arrangement could constitute the slipping clutch. If the magnet and clutch plate 348 are separated slightly, while allowing strong attraction, the clutch plate 348 could be coupled directly to the cam. With this arrangement the magnetic coupling would allow positive drive under normal circumstances while permitting slip when the blocking arm is engaged.

FIG. 9 shows an arrangement in which, instead of being located in the module, the slipping clutch is located in the projector housing. Here a direct drive to the cam shaft 341 is taken from the screw-driver and slot coupling. The shaft 347 includes the clutch having slipping plates 342, 348. The shaft is splined to allow plate 348 to slide longitudinally and the plates are urged together by a spring 728.

In a preferred embodiment of the invention the speed adjustment 323, 324 (FIG. 1) is dispensed with and the drive to the cam is geared so that the cam is driven marginally faster, typically by 1% or less, than appropriate for synchronous running with the film. Thus, for each frame there is a very short dwell period for the cam governed by the solenoid. Thus, if the film has shrunk there is a small margin of dwell which will be reduced by the faster-occurring synchronising pulses. If the film has stretched the dwell period will increase.

The arrangement described above with reference to the drawings with the dimensions given above achieves very fast fly-back and re-acceleration times, to such an extent that it is found that a shutter to obscure fly-back and re-acceleration period is not necessary. The light transmission efficiency of the projector is thus very good. This is enhanced by the fact that the lens can be very close to the film. The mirror is shaped as shown in accordance with the frame image shape at the mirror so as to reduce weight.

I claim:

1. A mirror mechanism for a continuous-movement cinematograph film projector, which projector has means for driving the film continuously and a drive shaft driven in synchronism with the film, the mirror mechanism comprising a compensating mirror; a pivot axis about which the mirror oscillates; a lever arm coupled to the mirror to oscillate the mirror; a cam-follower portion on the lever arm; a cam having a profile on which the cam-follower portion rides; a spring for urging the cam-follower portion into contact with the profile of the cam; a slipping clutch for coupling the cam to the drive shaft and allowing the cam to be arrested while the drive shaft continues to rotate; a blocking member having a blocking position where it engages the cam and a release position where it is clear of the cam, the cam being arrested by the blocking member when in the blocking position; and a solenoid which, when energised by an electrical release pulse, withdraws the blocking member to the release position to release the cam.

2. A mirror mechanism as claimed in claim 1 wherein the cam is a scroll cam having two flat faces perpendicular to an axis about which the cam rotates, the cam profile is constituted by the edge face defined between the two flat faces and a pin is mounted to protrude from one of the flat faces, the blocking member comprising a blocking pin which moves between the blocking position and the release position to engage and release the cam pin.

3. A mirror mechanism as claimed in claim 2 wherein the cam-follower portion is an upstanding roller and the scroll cam has at least one step where the roller is allowed to move rapidly to cause fly-back of the mirror and, near the step the cam is provided wth a desmodromic channel section to engage the roller to inhibit bounce.

4. A mirror mechanism as claimed in claim 1 which is mounted as a unit in a module, the module having a disengageable mounting including a coupling for the drive shaft, whereby the modoule may be mounted and removed from the projector as a unit.

5. A mirror mechanism as claimed in claim 4 wherein the slipping clutch has two discs which bear against each other face-to-face, one disc being coupled directly to the cam and the other being adapted for direct mating engagement with the drive shaft, which mating engagement constitutes the said coupling.

6. A mirror mechanism as claimed in claim 4 wherein the module defines a film gate aperture across which the film is fed and the module has a retractable fork for guiding and holding the film in position at the film gate.

7. A mirror mechanism as claimed in claim 6 wherein the film gate determined by the gate aperture and fork defines a film path curved about the mirror pivot axis.

8. A mirror mechanism as claimed in claim 7 wherein the curve is circular, centred on the mirror pivot axis.

* * * * *